(12) United States Patent
Okamoto et al.

(10) Patent No.: US 10,659,306 B2
(45) Date of Patent: May 19, 2020

(54) INFORMATION PROCESSING DEVICE AND METHOD FOR SETTING THE ENVIRONMENT OF THE DEVICE

(71) Applicant: Panasonic Intellectual Property Management Co., Ltd., Osaka (JP)

(72) Inventors: Ryuichi Okamoto, Osaka (JP); Masaki Mukai, Hyogo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 16/129,166

(22) Filed: Sep. 12, 2018

(65) Prior Publication Data

US 2019/0014011 A1 Jan. 10, 2019

Related U.S. Application Data

(63) Continuation of application No. PCT/JP2017/006696, filed on Feb. 23, 2017.

(30) Foreign Application Priority Data

Mar. 15, 2016 (JP) ................................ 2016-050330

(51) Int. Cl.
*H04L 12/24* (2006.01)
(52) U.S. Cl.
CPC .......... *H04L 41/12* (2013.01); *H04L 41/0853* (2013.01); *H04L 41/22* (2013.01)
(58) Field of Classification Search
CPC ...... H04L 41/12; H04L 41/0853; H04L 41/22
USPC ........................................................ 370/401
See application file for complete search history.

(56) References Cited

U.S. PATENT DOCUMENTS

| 8,433,375 | B2 * | 4/2013 | Yamazaki | H04W 48/20 455/574 |
| 9,699,034 | B2 * | 7/2017 | Lee | H04L 41/12 |
| 2003/0225894 | A1 * | 12/2003 | Ito | G06F 3/1204 709/227 |
| 2005/0289511 | A1 * | 12/2005 | Tucker | G06F 21/14 717/110 |

(Continued)

FOREIGN PATENT DOCUMENTS

| JP | 2008-520164 A | 6/2008 |
| JP | 2015-061304 | * 3/2015 |

(Continued)

OTHER PUBLICATIONS

International Search Report for corresponding International App. No. PCT/JP2017/006696, dated May 16, 2017.

*Primary Examiner* — Afsar M Qureshi
(74) *Attorney, Agent, or Firm* — Renner, Otto, Boiselle & Sklar, LLP

(57) ABSTRACT

An information processing device includes a communication unit, a storage unit, and a processor. The communication unit is connected to a network. The storage unit stores environment setting information indicating the environment of the device. The information is set according to the type of the network and the presence or absence of a virtual network created through the network. The processor sets the environment of the device based on the environment setting information in at least one of the following cases: when the network is switched to another network and when the presence or absence of the virtual network is changed.

2 Claims, 6 Drawing Sheets

(56) References Cited

U.S. PATENT DOCUMENTS

| | | | | |
|---|---|---|---|---|
| 2007/0011362 A1* | 1/2007 | Umekage | ............. | G06F 3/1208 |
| | | | | 710/15 |
| 2007/0064683 A1* | 3/2007 | Furukawa | .......... | H04N 1/00204 |
| | | | | 370/352 |
| 2009/0055545 A1* | 2/2009 | Saba | ..................... | G06Q 10/10 |
| | | | | 709/229 |
| 2010/0235504 A1* | 9/2010 | Sengupta | .............. | G06F 1/3209 |
| | | | | 709/224 |
| 2011/0191614 A1* | 8/2011 | Tsuzuki | ................... | G06F 1/32 |
| | | | | 713/320 |

FOREIGN PATENT DOCUMENTS

| | | |
|---|---|---|
| JP | 2015-061304 A | 3/2015 |
| WO | 2006/055127 A2 | 5/2006 |
| WO | 2006/055127 A3 | 5/2006 |

* cited by examiner

FIG. 4

| Identification information ⌐410 | Priority information ⌐420 | Communication environment setting information ⌐430 | Additional environment setting information (with a virtual network) ⌐441 | Additional environment setting information (without a virtual network) ⌐442 |
|---|---|---|---|---|
| Network A | 1 | IP address obtained via DHCP | Initiating Program A | Initiating program X |
| Network B | 2 | IP address: 192.168.111.10 | Initiating program B | Initiating program Y |
| Network C | 3 | IP address obtained via DHCP | Initiating program C | Initiating program Y |
| ... | ... | ... | ... | ... |
| Network ... | N | ... | ... | ... |

400

INFORMATION PROCESSING DEVICE AND METHOD FOR SETTING THE ENVIRONMENT OF THE DEVICE

This application is a continuation of International Patent Application No. PCT/JP2017/006696, filed on Feb. 23, 2017, and Japanese Application No. JP2016-050330, filed on Mar. 15, 2016, the entire contents of both are incorporated herein by reference.

BACKGROUND

1. Technical Field

The present disclosure relates to an information processing device with a network connection function, and a method for setting the environment of the device.

2. Description of Related Art

Japanese Translation of PCT International Application Publication No. 2008-520164 discloses an information processing device that tries to be connected to a plurality of networks in order of priority.

SUMMARY

The information processing device according to the present disclosure includes a communication unit, a storage unit, and a processor. The communication unit is connected to a network. The storage unit stores environment setting information indicating the environment of the device. The information is set according to the type of the network and the presence or absence of a virtual network created through the network. The processor sets the environment of the device based on the environment setting information in at least one of the following cases: when the network is switched to another network, and when the presence or absence of the virtual network is changed.

The method for setting the environment of an information processing device according to the present disclosure includes a first determining step, a second determining step, and an environment setting step. The first determining step determines whether a network currently connected to the device is switched to another network. The second determining step determines whether the presence or absence of a virtual network created through the network currently connected to the device is changed. The environment setting step sets the environment of the device according to the type of the network currently connected to the device and the presence or absence of the virtual network in at least one of the following cases: when the first determining step determines that the network currently connected to the device is switched to the other network, and when the second determining step determines that the presence or absence of the virtual network is changed.

The information processing device of the present disclosure can appropriately set its environment.

BRIEF DESCRIPTION OF DRAWINGS

FIG. 4 shows an example of a profile stored in the storage unit of the information processing device of the exemplary embodiment;

DETAILED DESCRIPTION

An exemplary embodiment will be described in detail as follows with reference to the accompanying drawings. However, the description of well-known matter and of substantially the same configuration as described earlier may be omitted to avoid redundancy and help those skilled in the art understand them easily.

Note that the attached drawings and the following description are provided to make those skilled in the art fully understand the present disclosure, and are not intended to limit the claimed subject matter.

Exemplary Embodiment

An exemplary embodiment of the present disclosure will now be described with reference to FIGS. 1 to 5.

1-1-1. System Configuration

Figure 1:
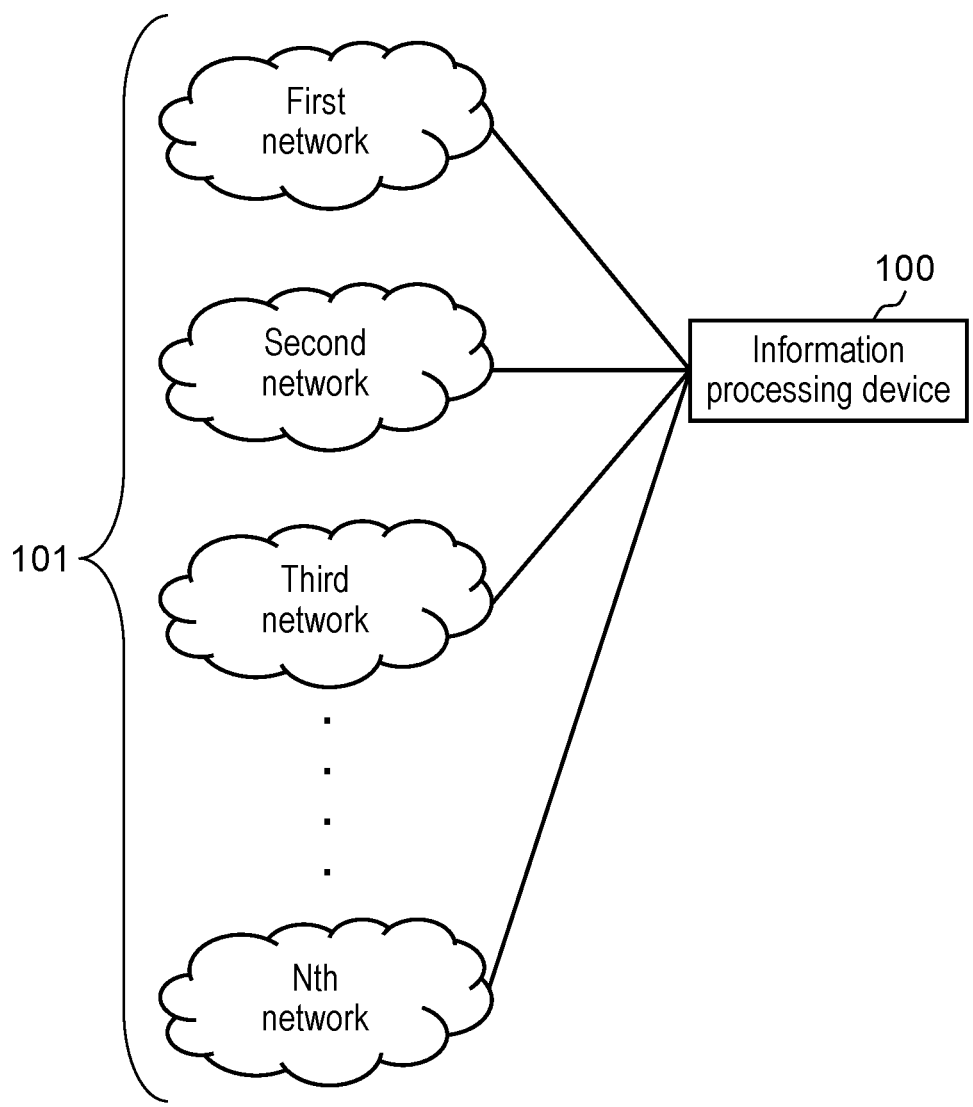
FIG. 1 is an explanatory diagram of an environment in which the information processing device of an exemplary embodiment of the present disclosure operates.

FIG. 1 is an explanatory diagram of an environment in which information processing device 100 of the exemplary embodiment operates. In FIG. 1, information processing device 100 operates in an environment including at least one network 101.

Network 101 is the network that information processing device 100 can be connected to. Network 101 can be any of various well-known types, such as a wireless wide area network (WWAN), a wireless local area network (WLAN/wireless LAN), a worldwide interoperability for microwave access (WiMAX, registered trademark) network, and a wired local area network (LAN). WWAN is a wireless communication service to provide a wide-area data communication network. WLAN/wireless LAN is a local area network that allows data to be transmitted and received wirelessly. WiMAX network is a standard of wireless communication technology. Wired LAN is a local area network that connects devices via a communication cable such as a copper wire or an optical fiber so as to provide electrical or optical communication.

In the present disclosure, when connected to any of these physical networks 101, information processing device 100 can create a virtual network through the connected network 101. Specific examples of the virtual network include virtual private networks (VPNs) and virtual local area networks (VLANs). Specific examples of the VPNs include secure sockets layer (SSL)-VPNs and other Internet VPNs. A VPN is used as, for example, an intra-company network, which connects different business locations in the state of being isolated from the outside. In the present disclosure, the term "network" used alone means a physical network, which is distinguished from a "virtual network".

1-1-2. Configuration of the Information Processing Device

Figure 2:
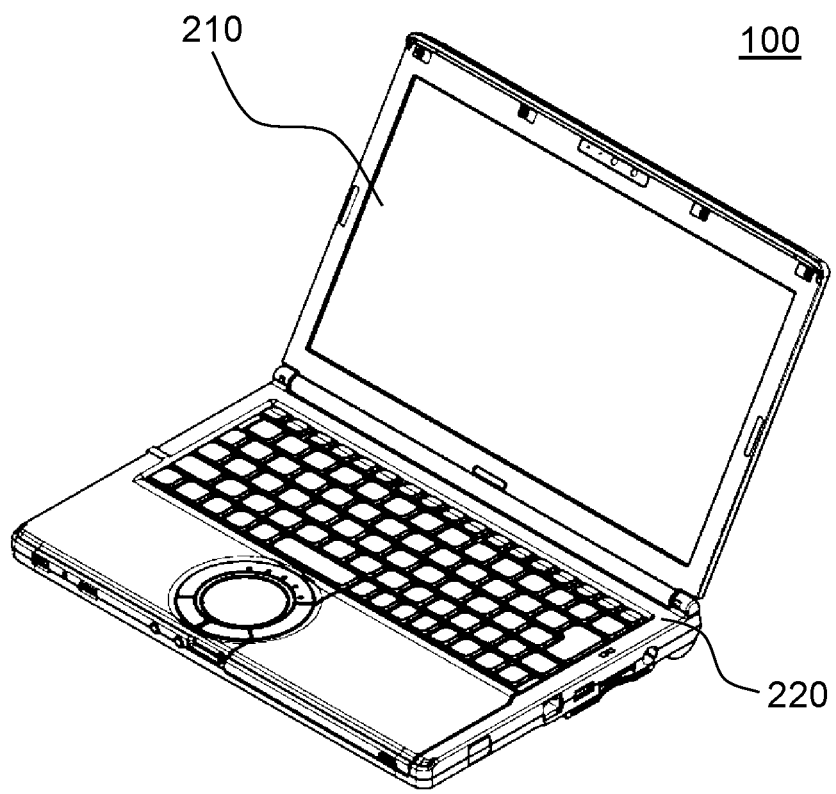
FIG. 2 is an external view of the information processing device of the exemplary embodiment.

FIG. 2 is an external view of information processing device 100 of the exemplary embodiment.

Information processing device 100 performs specific information processing on an operating system (OS). In the present exemplary embodiment, a notebook personal computer (PC) is used as an example of information processing device 100.

Besides notebook PCs, information processing device 100 of the present disclosure can be applied to laptop PCs, tablet PCs, smartphones, wearable computers, etc.

Information processing device 100 includes output unit 210 and input unit 220.

Output unit 210 displays images and videos. A typical example of output unit 210 is a liquid crystal display.

Input unit 220 receives inputs. Typical examples of input unit 220 include touch panels, keyboards, touch pads, and buttons.

Figure 3:
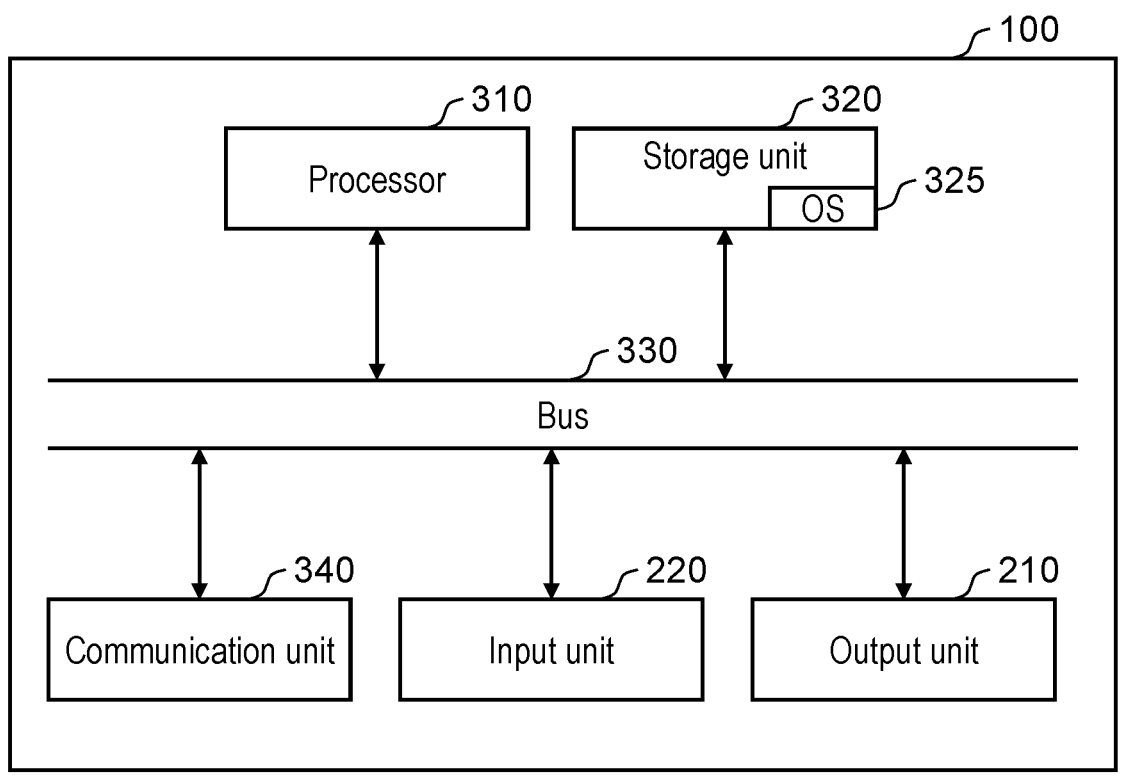
FIG. 3 is a block diagram of the information processing device of the exemplary embodiment.

FIG. 3 is a block diagram of information processing device 100 of the exemplary embodiment. As shown in FIG. 3, besides output unit 210 and input unit 220, information processing device 100 further includes processor 310, storage unit 320, bus 330, and communication unit 340.

Processor 310 executes programs to control the other components of information processing device 100. For example, processor 310 enables communication unit 340 to be connected to network 101.

Storage unit 320 stores data used by information processing device 100 either temporarily or permanently. For example, storage unit 320 stores OS 325, programs, and a profile, which is described later. Storage unit 320 can be, for example, a volatile memory, a nonvolatile memory, or a hard disk drive (HDD).

OS 325 is a software that governs the operation of information processing device 100.

Bus 330 is a channel for carrying electrical signals between the other components of information processing device 100. A control signal and data are transmitted and received between the components of information processing device 100 via bus 330.

Communication unit 340 performs a trial for connection to network 101, connection establishment, and disconnection under the control of processor 310. The trial for connection means that processor 310 communicates with the gateway specified for network 101 via communication unit 340 so as to establish connection with network 101. The connection establishment means that as a result of the above-described trial for connection, information processing device 100 has become able to communicate with a terminal in network 101. Communication unit 340 detects connection of a data communication card or network cable to information processing device 100 or a radio wave of WWAN or WLAN propagating through the air, thereby identifying the network that information processing device 100 can be connected to. Communication unit 340 then informs processor 310 of the identified network that can be connected to information processing device 100.

The number of communication unit 340 can be one or more. For example, a plurality of communication units 340 may be provided on a one-to-one basis for WWAN, WLAN, WiMAX, and wired LAN.

The above-mentioned components of information processing device 100 can be physically independent of each other, or some of them can be integrated. For example, one large scale integration (LSI) can contain some or all of the functions of processor 310, storage unit 320, and communication unit 340.

Furthermore, any of the above-mentioned components may be formed by combining physically independent components. For example, a logically single storage unit 320 can be composed of a plurality of physically different storage units.

In order to disperse the burden of processor 310, the actual processing can be performed by a plurality of processors or a micro-controller mounted inside communication unit 340 or storage unit 320. In the present exemplary embodiment, these components are collectively defined as processor 310.

1-1-3. Profile Configuration

FIG. 4 shows an example of a profile stored in storage unit 320 of information processing device 100 of the exemplary embodiment. Profile 400 is database format information. Profile 400 stores at least one set of the following five types of information: identification information 410; priority information 420 corresponding to information 410; communication environment setting information 430; additional environment setting information (without a virtual network) 441, and additional environment setting information (with a virtual network) 442. Of these five types, additional environment setting information 441 and 442 correspond to the environment setting information of the present disclosure.

Identification information 410 identifies network 101 connected to information processing device 100. To be more specific, information 410 identifies the type of a network, such as WLAN, WiMAX, WWAN, or wired LAN. In addition, information 410 may further include a service set identifier (SSID), which identifies an access point of wireless LAN or information to identify the provider of WiMAX or WWAN. Furthermore, information 410 may have a name that the user has given to a specific network. In short, information 410 has only to identify each of the plurality of networks 101 as a connected network.

Priority information 420 indicates the order of connection to network 101. The order of connection to network 101 is hereinafter referred to as priority. For example, if information processing device 100 is connectable to both network A and network B, processor 310 refers to priority information 420 and allows communication unit 340 to try to be connected to the network with the higher priority between networks A and B. In the present exemplary embodiment, as the number assigned to a network is smaller in the column of priority information 420 in FIG. 4, the network has a higher priority. Consequently, if information processing device 100 is connectable to both networks A and B, processor 310 enables communication unit 340 to try to be connected to network A first. In the present exemplary embodiment, processor 310 determines at specified intervals, such as several seconds to several milliseconds whether there is a connectable one among networks 101. If there are a plurality of connectable networks, the connection to each of these networks is tried in ascending order of priority with reference to priority information 420.

In the example of FIG. 4, communication environment setting information 430 indicates how the IP address of communication unit 340 is set when communication unit 340 is connected to network 101. Communication environment setting information 430 shown in FIG. 4 indicates that when information processing device 100 is connected to network A, the IP address of communication unit 340 used to be connected to network 101 is obtained via dynamic host configuration protocol (DHCP). Communication environment setting information 430 further indicates that when, for example, network A is switched to network B, the IP address of communication unit 340 used to be connected to network 101 is changed to IP address, 192.168.111.10.

Additional environment setting information 441 shown in FIG. 4 is about the environment of information processing device 100, which is set depending on the network to be connected when no virtual network has been created through the network. Meanwhile, additional environment setting information 442 is about the environment of information processing device 100, which is set depending on the network to be connected when a virtual network has been created through the network. Additional environment setting information 441 and 442 indicates additional setting information besides communication environment setting information 430, which is set depending on the network to be connected. In the example of FIG. 4, additional environment setting information 441 and 442 indicates which program should be initiated. To be more specific, additional environment setting information 441 of FIG. 4 indicates that when information processing device 100 is currently connected to network A and no virtual network has been created, processor 310 initiates a program A. On the other hand, additional environment setting information 442 of FIG. 4 indicates that when information processing device 100 is currently connected to network A and a virtual network has been created, processor 310 initiates a program X.

Additional environment setting information 441 and 442 shown in FIG. 4 corresponds to the environment setting information of the present disclosure. Thus, the environment setting information indicates that when information processing device 100 is connected to network 101, how various environment settings should be changed depending on whether a virtual network has been created. The environment setting information may further contain the following environment settings: proxy; default printer; Web browser website; operating system; application software; save files; various communication environments; and desktop icon arrangement.

1-2. Operation of Information Processing Device 100

The operation of information processing device 100 with the above-described structure will be described as follows.

Figure 5:
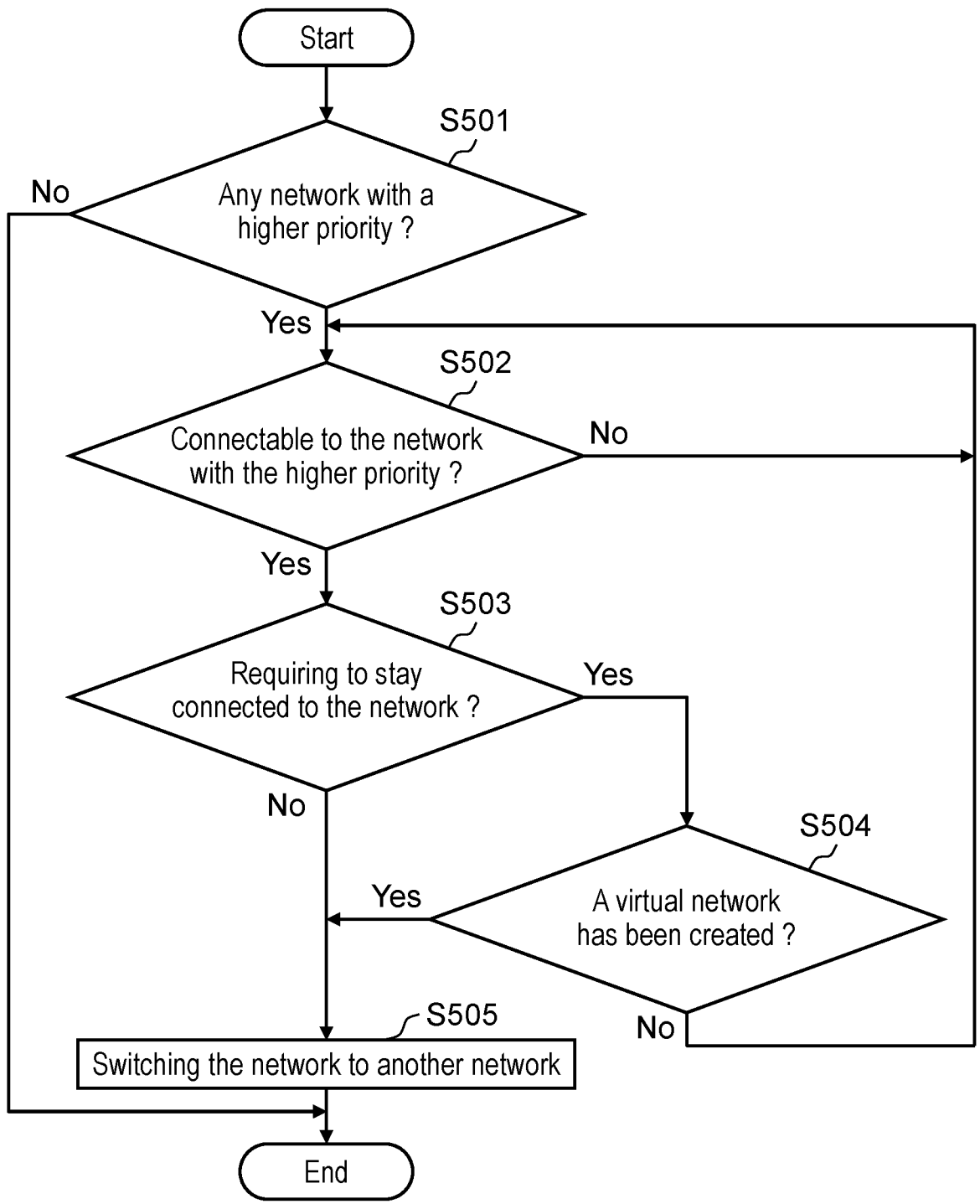
FIG. 5 is a flowchart showing how the information processing device of the exemplary embodiment operates when the device is connected to a network.

FIG. 5 is a flowchart showing how information processing device 100 operates when it is connected to any of networks 101.

At the beginning of the flowchart in FIG. 5, assume that information processing device 100 is currently connected to a network C (first network) of the plurality of networks 101 shown in FIG. 4. In this case, when connected to the network C, information processing device 100 starts processing according to the flowchart shown in FIG. 5.

Processor 310 refers to profile 400 stored in storage unit 320 and determines whether profile 400 contains any network 101 with a higher priority than the currently connected network C (Step S501). If profile 400 contains any such higher-priority network 101 (Yes in Step S501), the process goes to Step S502. On the other hand, if profile 400 does not contain any higher-priority network 101 (No in Step S501), the process of the flowchart in FIG. 5 is terminated. To be more specific, assume that identification information 410 indicates that information processing device 100 is currently connected to the network C with a priority of "3" as priority information 420. In this case, processor 310 determines that profile 400 contains networks 101 whose priorities are "1" and "2" indicating higher priority than "3", and the process goes to Step S502. Meanwhile, if information 410 indicates that information processing device 100 is currently connected to the network A with a priority of "1", processor 310 determines that profile 400 does not contain any networks 101 with higher priorities than the network A. Hence, the process of the flowchart shown in FIG. 5 is terminated.

Processor 310 determines whether information processing device 100 can be connected to network 101 with a higher priority than the currently connected network C (Step S502). To be more specific, processor 310 controls communication unit 340 and searches for networks 101 with higher priorities than the network C. If information processing device 100 can be connected to the network 101 with the higher priority than the currently connected network C (Yes in Step S502), processor 310 determines this connectable network 101 as a candidate to be connected after the network C, and the process goes to Step S503. If there are a plurality of connectable networks 101, the network 101 with the highest priority is determined to be the candidate to be connected next, based on priority information 420. If information processing device 100 cannot be connected to the network 101 with a higher priority than the currently connected network C (No in Step S502), the process returns to Step S502 when a predetermined time has passed.

Next, processor 310 determines whether information processing device 100 is performing an operation that requires information processing device 100 to stay connected to the currently connected network 101 (Step S503). To be more specific, processor 310 checks the communication of communication unit 340 and determines whether information processing device 100 is continuously communicating through the currently connected network C. If information processing device 100 is determined to be continuously communicating (Yes in Step S503), the process goes to Step S504; otherwise (No in Step S503), the process goes to Step S505. Specific examples of the operation that requires information processing device 100 to stay connected to the currently connected network 101 include upload and download of files.

When information processing device 100 is required to stay connected to the currently connected network 101, processor 310 determines whether information processing device 100 has created a virtual network (Step S504). If a virtual network has been created (Yes in Step S504), the process goes to Step S505. Otherwise (No in Step S504), information processing device 100 is kept connected to the currently connected network C, and the process returns to Step S502 when a predetermined time has passed. One approach for processor 310 to determine whether a virtual network has been created is to determine whether communication unit 340 contains a virtual adapter, and if it does, to determine whether the virtual adapter is connected to the network (e.g., the network C). If the virtual adapter is connected to the network, processor 310 determines that the virtual network has been created. Another approach is to determine whether a virtual network exists in the networks that OS 325 has determined to be currently connected. If such a virtual network exists, processor 310 determines that the virtual network has been created. Still another approach is to make software dedicated to creating a virtual network operate on OS 325, and to make this software inform processor 310 of the presence or absence of a virtual network.

Processor 310 controls communication unit 340 so that the network C, which is currently connected to communication unit 340, is switched to the network determined, in Step S502, to be the candidate to be connected next (Step S505).

As shown in FIG. 5, networks 101 to be connected to information processing device 100 are automatically switched from one to another, but may alternatively be switched manually by the user of information processing device 100.

Figure 6:
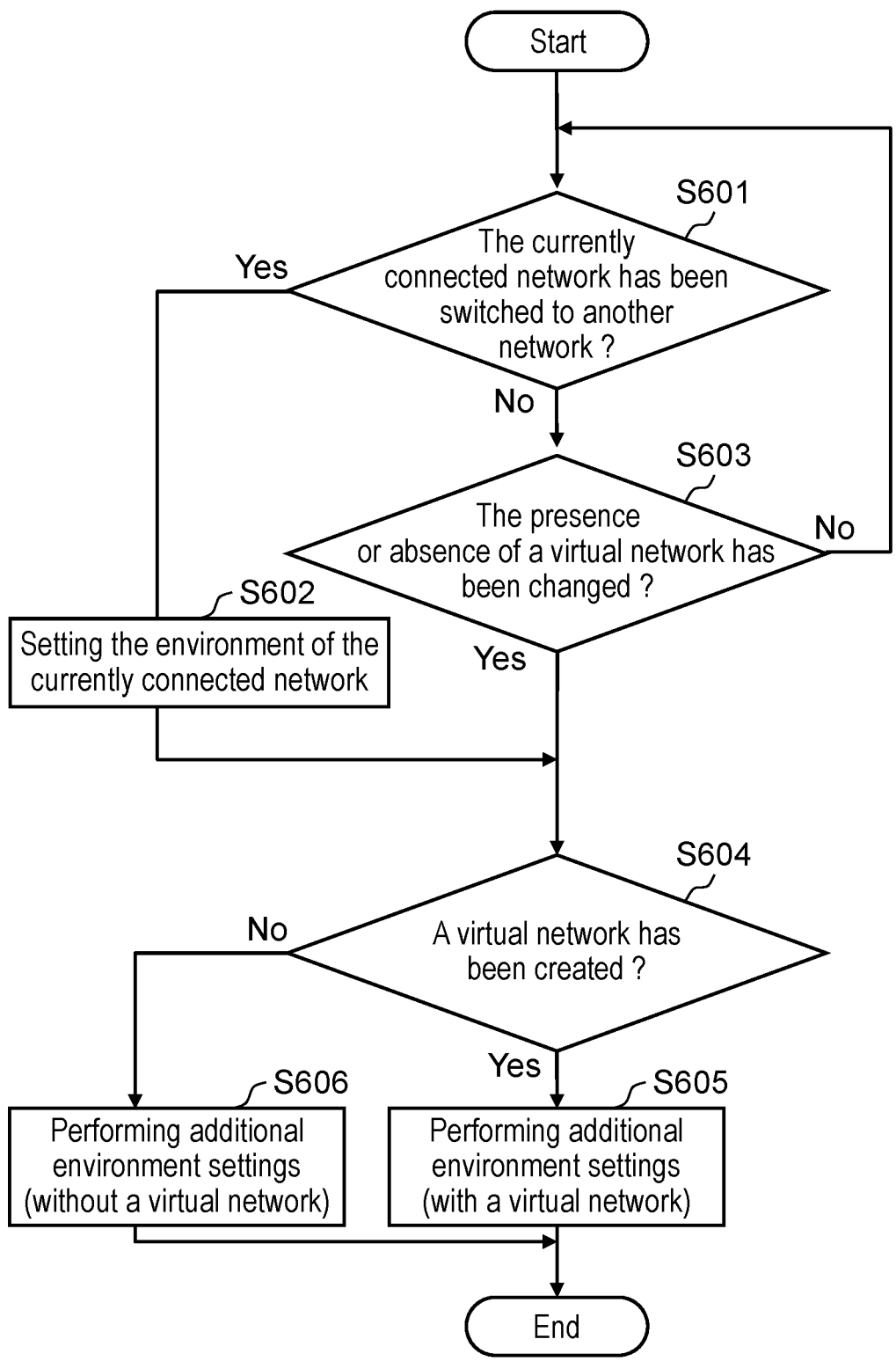
FIG. 6 is a flowchart showing how the information processing device of the exemplary embodiment operates when the currently connected network is determined to have been switched to another network or when the presence or absence of a virtual network created through the currently connected network is determined to have changed.

FIG. 6 is a flowchart showing how information processing device 100 operates when the currently connected network 101 is determined to have been switched to another network or when the presence or absence of a virtual network created through the currently connected network 101 is determined to have changed.

Processor 310 determines at specified intervals whether the currently connected network 101 has been switched to another network 101 (Step S601). Step S601 corresponds to the first determining step of the present disclosure. When detecting that the currently connected network 101 has been switched to another network 101 (Yes in Step S601), processor 310 refers to profile 400 and performs various environment settings according to communication environment setting information 430 corresponding to the newly connected network 101 (Step S602).

Meanwhile, when not detecting that the currently connected network 101 has been switched to another network 101 (No in Step S601), processor 310 determines at specified intervals whether the presence or absence of a virtual network has been changed (Step S603). Step S603 corresponds to the second determining step of the present disclosure.

If processor 310 does not determine that the presence or absence of a virtual network has been changed (No in Step S603), the process returns to Step S601.

Meanwhile, if the presence or absence of a virtual network is determined to have changed either after Step S602 or in Step S603 (Yes in Step S603), the process goes to Step S604.

In Step S604, processor 310 determines whether information processing device 100 has created a virtual network. If a virtual network has been created (Yes in Step S604), the process goes to Step S605; otherwise (No in Step S604), the process goes to Step S606. Whether processor 310 has created a virtual network can be checked in the same manner as in Step S504. If processor 310 has already determined that the presence or absence of a virtual network is changed in Step S603, the process can skip Step S604 and go to either Step S605 or S606.

In Step S605, processor 310 refers to profile 400 and performs various environment settings according to additional environment setting information (with a virtual network) 442 corresponding to the currently connected network 101.

In Step S606, processor 310 refers to profile 400 and performs various environment settings according to additional environment setting information (without a virtual network) 441 corresponding to the currently connected network 101. Steps S605 and S606 correspond to the environment setting step of the present disclosure.

It is alternatively possible, in Steps S602, S605, and S606, for processor 310 to determine whether the settings remain the same as before so as not to repeat the same settings.

1-3. Effects and Others

As described so far, the information processing device according to the present disclosure includes a communication unit for being connected to a network, a storage unit for storing a profile, and a processor for controlling the communication unit and the storage unit. The profile contains environment setting information indicating the settings of the environment of the device. The information is set according to the type of the network and the presence or absence of a virtual network. The processor sets the environment of the device based on the environment setting information in at least one of the following cases: when the network is switched to another network, and when the presence or absence of the virtual network is changed.

The method of setting an environment of an information processing device according to the present disclosure includes a first determining step, a second determining step, and an environment setting step. The first determining step determines whether a network currently connected to the device is switched to another network. The second determining step determines whether the presence or absence of a virtual network created through the network currently connected to the device is changed. The environment setting step sets the environment of the device according to the type of the network currently connected to the device and the presence or absence of the virtual network in at least one of the following cases: when the first determining step determines that the network currently connected to the device is switched to the other network, and when the second determining step determines that the presence or absence of the virtual network is changed.

With this configuration, even if the currently connected network is the same, the environment becomes different depending on whether a virtual network has been created. Furthermore, when the currently connected network is switched to another network, the environment becomes different depending on whether a virtual network has been created. Consequently, information processing device 100 of the present disclosure can appropriately set its environment.

Specific applications of information processing device 100 are as follows. When a notebook PC is connected to a network at home, and an intra-company network exists, the settings of Web browser website and printer are optimized for business use. Meanwhile, when the notebook PC is disconnected from the intra-company network, various environment settings are changed for private use.

The present disclosure is applicable to information processing devices with a network connection function, such as personal computers, smartphones, and wearable computers.

What is claimed is:

1. An information processing device comprising:
   circuitry configured to communicate and be connected to a network;
   a storage device comprising a nonvolatile memory configured to store information specifying (i) icon arrangement of the information processing device or (ii) a default printer of the information processing device, the information being set according to a type of the network and a presence or absence of a virtual network created through the network; and
   a processor configured to set appearance of a display output, which is connected to the information processing device, based on the information stored by the storage device in at least one of following cases:
   when the network is switched to another network, and
   when the presence or absence of the virtual network is changed.

2. A method for setting an environment of an information processing device, the method comprising:
   a first determining step of determining whether a network currently connected to the information processing device is switched to another network;
   a second determining step of determining whether a presence or absence of a virtual network created through the network currently connected to the information processing device is changed; and an environment setting step of setting (i) icon arrangement of the information processing device or (ii) a default printer of the information processing device a display output, which is connected to the information processing device according to a type of the network currently connected to the information processing device and the presence or absence of the virtual network in at least one of following cases:

when the first determining step determines that the network currently connected to the information processing device is switched to the another network, and when the second determining step determines that the presence or absence of the virtual network is changed.

\* \* \* \* \*